US007312743B2

(12) United States Patent
Ridenour et al.

(10) Patent No.: US 7,312,743 B2
(45) **Date of Patent: *Dec. 25, 2007**

(54) SYSTEMS AND METHODS FOR DISPLAYING HAZARDS

(75) Inventors: Richard Ridenour, Glendale, AZ (US); Steven Gregory Scott, Peoria, AZ (US)

(73) Assignee: Aviation Communication & Sureillance Systems, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/430,545

(22) Filed: May 8, 2006

(65) Prior Publication Data

US 2007/0159377 A1 Jul. 12, 2007

Related U.S. Application Data

(63) Continuation of application No. 10/774,060, filed on Feb. 6, 2004, now Pat. No. 7,042,387.

(51) Int. Cl.
*G01S 13/95* (2006.01)

(52) U.S. Cl. ..................... 342/26 B; 342/179; 345/440

(58) Field of Classification Search .............. 342/26 B, 342/26 R, 176–185; 345/440; 340/539.28, 340/945, 963, 971
See application file for complete search history.

(56) References Cited

U.S. PATENT DOCUMENTS 4,484,192 A 11/1984 Seitz et al.
4,825,381 A 4/1989 Bottorf et al.
5,049,886 A * 9/1991 Seitz et al. ............... 342/26 B
5,179,638 A 1/1993 Dawson et al.
5,196,854 A * 3/1993 Mathews .................. 342/26 B
5,311,183 A 5/1994 Mathews et al.
6,133,867 A * 10/2000 Eberwine et al. ............. 342/29
6,184,816 B1 * 2/2001 Zheng et al. ............. 342/26 R
6,219,051 B1 4/2001 Furuya (Continued)

FOREIGN PATENT DOCUMENTS

EP 0 405 430 A2 1/1991

(Continued)

OTHER PUBLICATIONS

"ARINC 429 Tutorial," Condor Engineering, [on line], [retrieved on Jan. 28, 2004]. Retrieved from the Internet <http://www.429-arinc.com/arinc-429-tutorial.html>, pp. 1-5.

(Continued)

*Primary Examiner*—John B. Sotomayor
(74) *Attorney, Agent, or Firm*—Allen J. Moss; Squire, Sanders & Dempsey L.L.P.

(57) ABSTRACT

A system, according to various aspects of the present invention, provides a presentation to a hazard display. The system includes a memory having surveillance data and a processor. The processor updates an image in accordance with the surveillance data to provide an updated image. The processor also prepares a presentation in accordance with the updated image. The processor further provides the presentation to the hazard display. At least one of updating, preparing, and providing utilize a first scan mode for a hazardous region of the presentation and a second scan mode for a nonhazardous region of the presentation.

3 Claims, 6 Drawing Sheets

U.S. PATENT DOCUMENTS

| | | | | |
|---|---|---|---|---|
| 6,448,922 | B1 | 9/2002 | Kelly | |
| 6,563,452 | B1 * | 5/2003 | Zheng et al. | 342/26 R |
| 6,791,476 | B1 * | 9/2004 | Hedrick | 340/971 |
| 7,042,387 | B2 | 5/2006 | Ridenour et al. | |
| 2005/0174350 | A1 * | 8/2005 | Ridenour et al. | 345/440 |

FOREIGN PATENT DOCUMENTS

| | | |
|---|---|---|
| EP | 0 405 430 A3 | 1/1991 |

OTHER PUBLICATIONS

"Weather Radar & Stormscopes Our Opinions on Weather Radar Avionics," Eastern Avionics International, Inc., [on line], [retrieved on Feb. 5, 2003]. Retrieved from the Internet.

Hal Stoen, "Airborne Weather Radar," [on line], [retrieved on Feb. 5, 2003]. Retrieved from the Internet <http://stoenworks.com/tutorials/weather%20radar.html>, pp. 1-4.

"Weather Avoidance Systems," Honeywell, [on line], [retrieved on Feb. 5, 2003]. Retrieved from the Internet <http://www.myfli. . . /dbacess?operation=systems &category=weather+avoidance+system>, pp. 1-6.

"Avidyne Multifunction Flight Computer Systems," Chief Avionics Inc., [on line], [retrieved on Feb. 5, 2003]. Retrieved from the Internet <http://www.chiefaircraft.com/avionics/mfgai/avidyne.html>, pp. 1-3.

"Plot Domains," [on line], [retrieved on Feb. 5, 2003]. Retrieved from the Internet <http://weather.unisys.com/wxp/appendices/plot_domain.html>, pp. 1-2.

FlightMax EX500 With Integrated Datalink, [on line], [retrieved on Feb. 5, 2003]. Retrieved from the Internet <http://www.avidyne.com/ex500/flightmaxex500.htm>, pp. 1-7.

"Cathode-Ray Tube," [on line], [retrieved on Feb. 5, 2003]. Retrieved from the Internet <http://www.ceng.metu.edu.tr/~isler/nli/ceng378/lectures/2hafta/not2-0.html>, pp. 1-2.

"Raster Scan Display Devices," [on line], [retrieved on Feb. 5, 2003]. Retrieved from the Internet <http://www.ceng.metu.edu.tr~isler/nli/ceng378/lectures/2hafta/not2-2.html>, pp. 1-2.

"Graphics Systems," [on line], [retrieved on Feb. 5, 2003]. Retrieved from the Internet <http://www.ceng.metu.edu.tr/~isler/nli/ceng378/lectures/2hafta/not2-3.html>, pp. 1-2.

"Coordinate Representations," [on line], [retrieved on Feb. 5, 2003]. Retrieved from the Internet <http://www.ceng.metu.edu.tr/~isler/nli/ceng378/lectures/2hafta/not2-4.html>, pp. 1.

"Drawing Geometric Primitives in OpenGL," [on line], [retrieved on Feb. 5, 2003]. Retrieved from the Internet <http://www.ceng.metu.edu.tr/~isler/nli/ceng378/lectures/2hafta/not2-4.html., pp. 1-2.

"RBG Color in OpenGL," [on line], [retrieved on Feb. 5, 2003]. Retrieved from the Internet <http://www.ceng.metu.edu.tr/~isler/nli/ceng378/lectures/2hafta/not2-6.html>, pp. 1.

"Collins WXR-2100 Multiscan™ Weather Radar," Rockwell Collins, pp. 1-11. 2003.

"Goodrich RBC250 Radar Graphics Computer Performance Specifications," Goodrich Avionics Systems. 2003.

"A clutter removal strategy for weather radars, based on neutral network approaches and using polarisation diversity as feature space", da Silveria, R.B.; Holt, A.R. Radar 97, Oct. 14-16, 1997, Pub No. 449.

* cited by examiner

SYSTEMS AND METHODS FOR DISPLAYING HAZARDS

CROSS-REFERENCE TO RELATED APPLICATION

This application is a continuation of and claims priority to U.S. patent application Ser. No. 10/774,060, filed Feb. 6, 2004 now U.S. Pat. No. 7,042,387 in the name of Richard Ridenour et al., which is incorporated herein by reference.

FIELD OF THE INVENTION

Embodiments of the present invention relate to alerting an operator to hazardous conditions in the environment surrounding the equipment being operated.

BACKGROUND OF THE INVENTION

Conventional hazard displays are used to reduce the risk of damage to vehicles, damage to property, personal injury, and loss of life. Such displays are often used by vehicle operators (e.g., aircraft pilots) and operators of supervisory equipment (e.g., air traffic controllers). Hazards to vehicular operation are diverse. Hazards to aircraft include collision with terrain, collision with other aircraft (traffic), and encountering adverse weather. Conventional airborne weather displays and aircraft terrain displays present information describing areas where hazards (also called potential threats) are located relative to the position of the host aircraft. U.S. Pat. No. 4,484,192 to Seitz et al., U.S. Pat. No. 4,825,381 to Bottorf et al., U.S. Pat. No. 5,049,886 to Seitz et al., U.S. Pat. No. 5,179,638 to Dawson et al., and U.S. Pat. No. 6,448,922 to Kelly describe conventional hazard displays used in aircraft. Certain of these displays have dual use configurations in that they are capable of displaying weather radar information in a first setting and terrain information in a second setting.

Conventional displays operate according to a scan mode. The scan mode may use either a polar coordinate system or a Cartesian coordinate system. In airborne weather radar systems (which may include terrain display capabilities) the updating of weather information correlates with a sweep of the radar beam through a range of azimuth positions about the host aircraft position. Weather information is updated along a radial scan line having an origin generally centrally located at the bottom of the displayed image and proceeding in an arc about the origin. This scan mode and its image are sometimes referred to as "rho-theta" or as a "rho-theta" image because information is updated at a distance from the origin (rho) on the radial scan line when the radial scan line arrives at an angle (theta) in the arc across the displayed image. Of course, the rho-theta image may be produced and refreshed by vector or raster scan techniques independent of the manner in which information is updated. When weather radar displays are used to display terrain information, the terrain information is conventionally updated using the rho-theta scan mode. This manner of updating was initially adopted to accommodate the signal interface to the weather radar system display. Conventional raster displays continue to use rho-theta scan mode regardless of whether the image describes weather hazards or terrain hazards.

The exemplary conventional weather and terrain hazard display 100 of FIG. 1 presents a displayed image updated using a rho-theta scan mode. Display 100 includes a screen 110 and control panel 130. The displayed image 124 presented on screen 110 includes indicia of tracked objects 120-122. Tracked objects 120-122 may correspond to weather, terrain, and/or traffic. A hazardous region 145 is distinguished in displayed image 124 from other information by, for example, distinct color (e.g., red or yellow), distinct texture, brightness, or symbology. The region 145 may be considered particularly hazardous due to the type, number, or density of individual hazards. Control panel 130 permits an operator to select weather or terrain hazard information (mode), adjust how bright the image appears in ambient lighting (brightness), and select the scale of the displayed image (range). In operation, displayed image 124 may include one or more range identifying lines (dashed), each to denote a distance relative to the origin of the displayed image (i.e., a planned position indicator using an aircraft symbol just above the origin). The distance corresponding to each range identifying line may be 25%, 50%, and 75% of the user selected range (e.g., 10 nm). Displayed image 124 also includes a rho-theta scan line 125 that indicates the portion of the image being updated. The scan line sweeps in a continuous 180° arc between points A and B clockwise (always starting at point A), counter clockwise (always starting at point B), or alternating (A to B, then B to A). The alternating rho-theta scan mode is also called "wiper" mode analogous to automobile windshield wiper motion. If the display uses vector technology for refreshing the displayed image, the scan line 125 also indicates the portion of the image being refreshed.

An alternative to rho-theta scan mode is based on a Cartesian coordinate system. Here, the scan line is either horizontal or vertical and sweeps as a line parallel to a Cartesian coordinate axis (e.g., x or y). This scan mode is sometimes referred to as Cartesian "curtain" scan mode. The image is sometimes referred to as a curtain image because the scan line is analogous to a theater curtain.

In yet another conventional scan mode, updates are made at random positions in the displayed image. This scan mode is called random scan mode herein.

In rho-theta or Cartesian coordinate systems, alternate scan modes include scan modes called "fan" modes where two scan lines move in a manner analogous to opening and/or closing an oriental fan. In a fan mode, the displayed image is updated using two scan lines that begin at a central point (e.g., point C in FIG. 1) in the displayed image and proceed to the extremities of the displayed image (e.g., points A and B in FIG. 1). A second update may begin at the same point (C) or may begin at the extremities (A and B) and move toward the center (C) of the displayed image. Updating and/or refreshing on a vector refresh display may quickly alternate between the positions of the two scan lines.

Conventional displays may permit an operator to select one scan mode (e.g., "clockwise", "wiper", "opening fan") for the displayed image as a whole.

Conventional scan modes as discussed above delay the presentation of updated information by providing the same update rate to the displayed image as a whole. Consequently, it is not possible for an operator to determine a central point (e.g., central azimuth) of a hazard or the perimeter of a hazard until the entire region of the displayed image describing the hazard has been scanned. Conventional displayed images have a uniform resolution throughout. Consequently, time may be inappropriately spent updating, at a high resolution, a portion of the displayed image having comparatively little hazard information. Updated information may change the shape, bearing, and distance to a hazard as well as the status of a region (e.g., region 145 in FIG. 1). Delay in the presentation of information may delay an operator's awareness of a hazard' and may reduce the time the operator has to avoid the hazard

SUMMARY OF THE INVENTION

One or more of the problems discussed above is overcome by systems and methods for the presentation of descriptions of hazards. According to various aspects of the present invention, a method includes in any order: (a) identifying a first scan mode for processing a first portion of a presentation comprising a hazardous region; (b) identifying a second scan mode for processing a second portion of the presentation not overlapping the first portion; and (c) directing processing for the presentation in accordance with the first scan mode and the second scan mode.

A system, according to various aspects of the present invention, provides a presentation to a hazard display. The system includes a memory having surveillance data and a processor. The processor updates an image in accordance with the surveillance data to provide an updated image. The processor also prepares a presentation in accordance with the updated image. The processor further provides the presentation to the hazard display. At least one of updating, preparing, and providing utilize a first scan mode for a hazardous region of the presentation and a second scan mode for a nonhazardous region of the presentation.

The description of a hazard may include any of bearing toward the hazard, distance to the hazard, shape of the hazard, elevation of the hazard, closing velocity, status of the hazard (e.g., presently a hazard, not yet a hazard, and/or a degree of risk associated with the hazard or potentially hazardous entity).

A memory device according to various aspects of the present invention includes indicia of instructions for performing a method as discussed above, and/or data for the selection of scan modes.

By reducing a delay in processing updated information, especially with respect to information related to nearby hazards, increased safety to property and personnel results.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
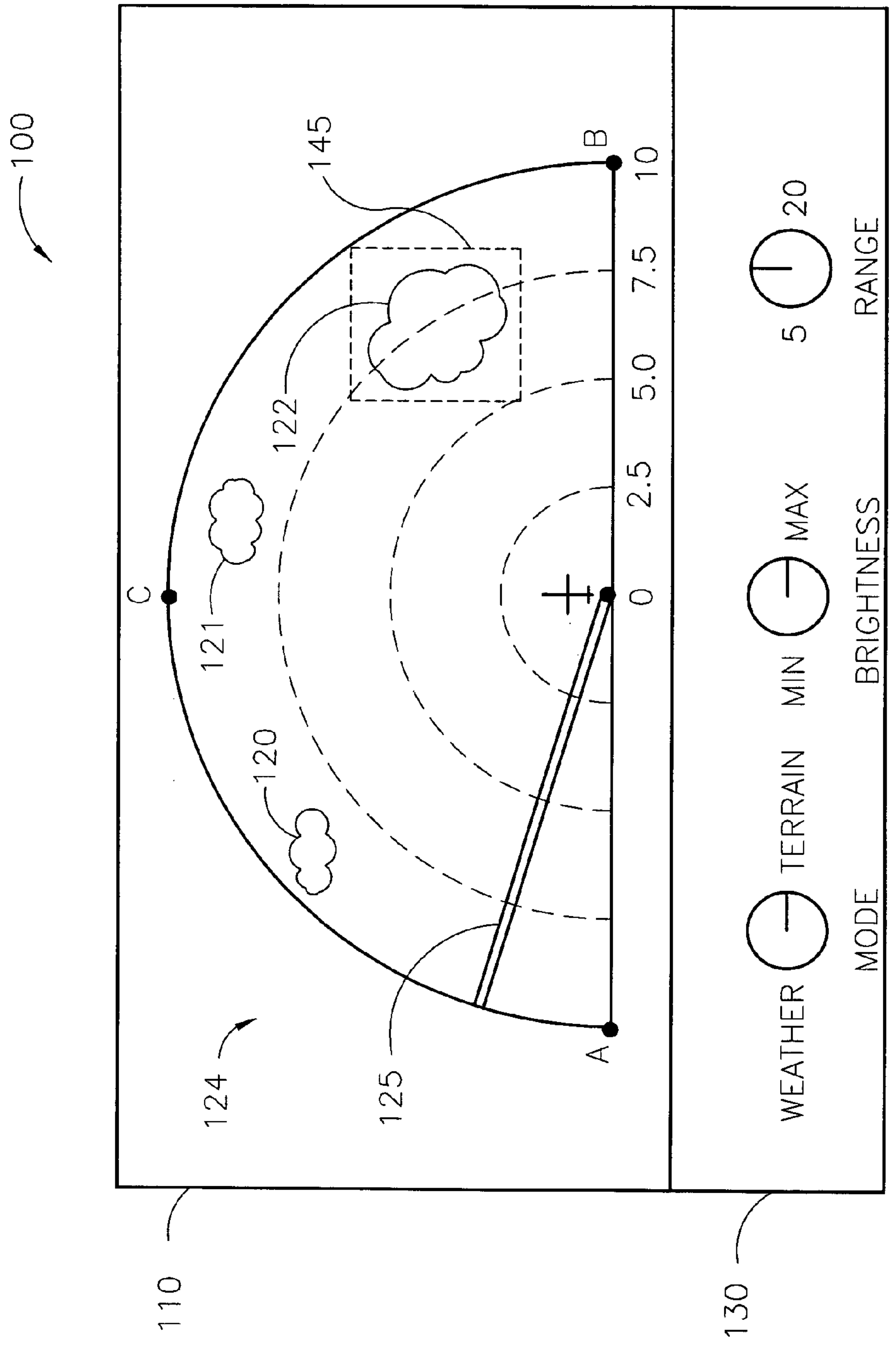
FIG. 1 ( RELATED ART )
FIG. 1 is a front view of a conventional terrain and weather display system.
Figure 2:
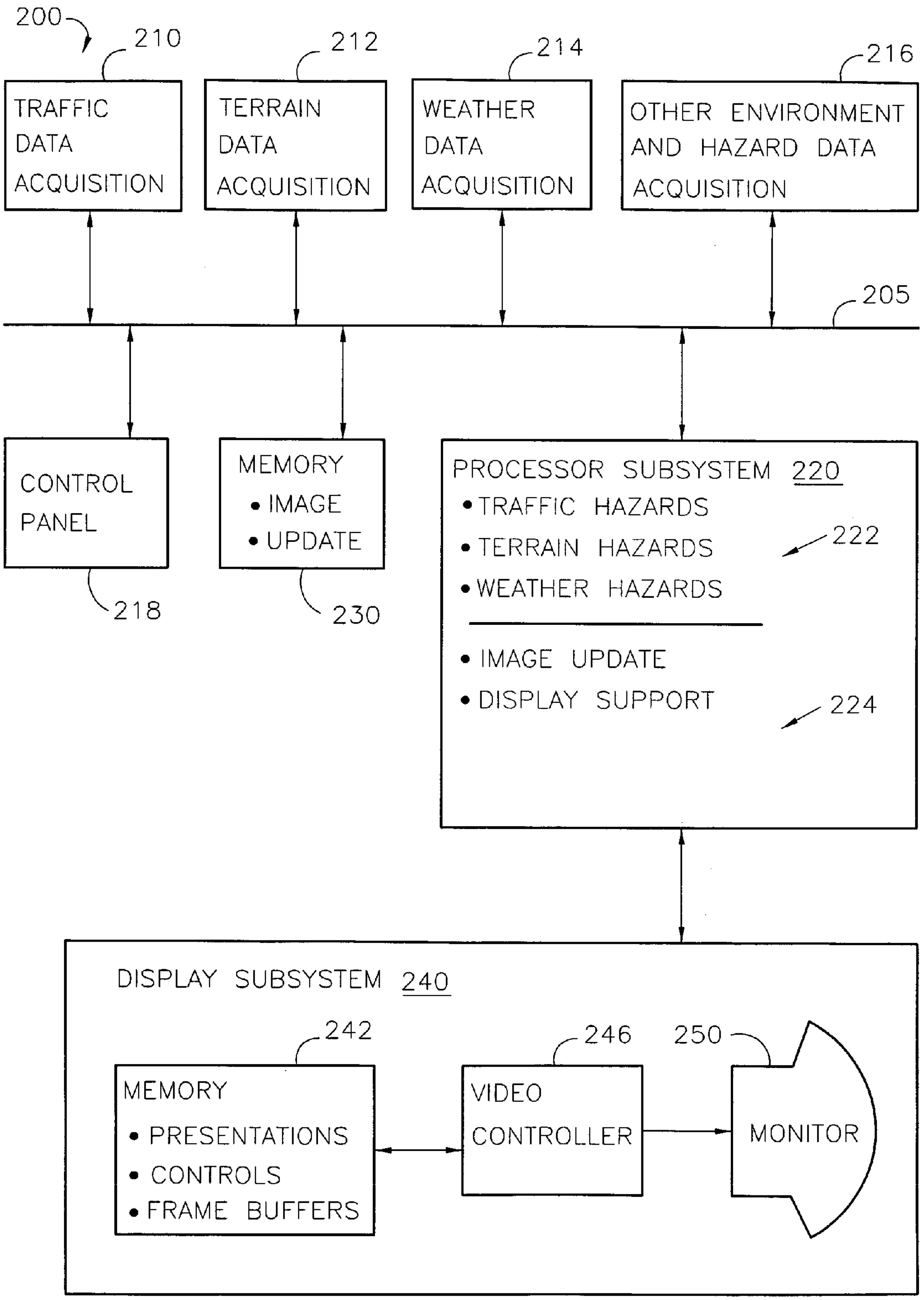
FIG. 2 is a functional block diagram of a system according to various aspects of the present invention.
Figure 3:
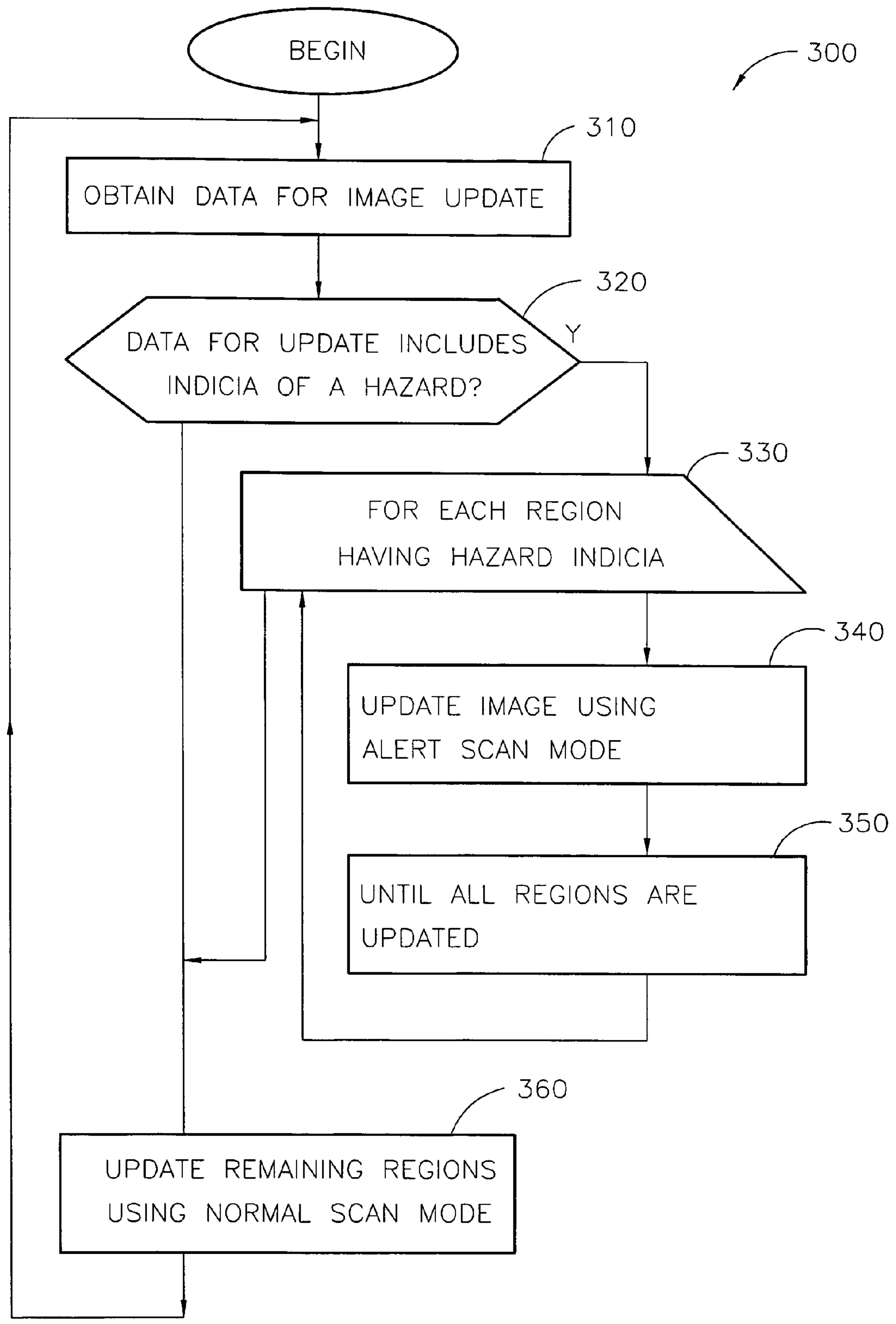
FIG. 3 is a process flow diagram of a method for updating information performed by the system of FIG. 2.
Figure 4:
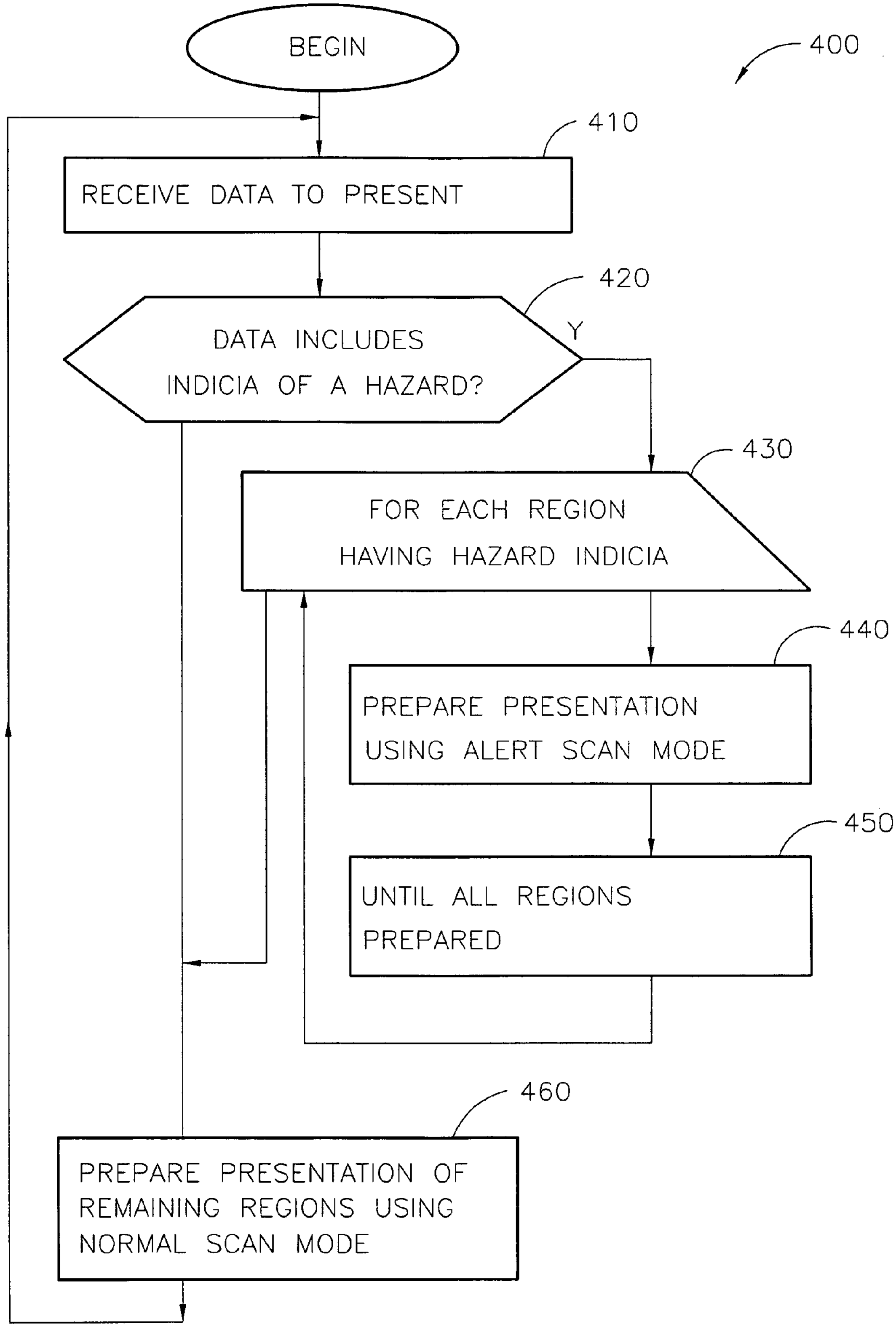
FIG. 4 is a process flow diagram of a method for preparing a presentation performed by the system of FIG. 2.
Figure 5:
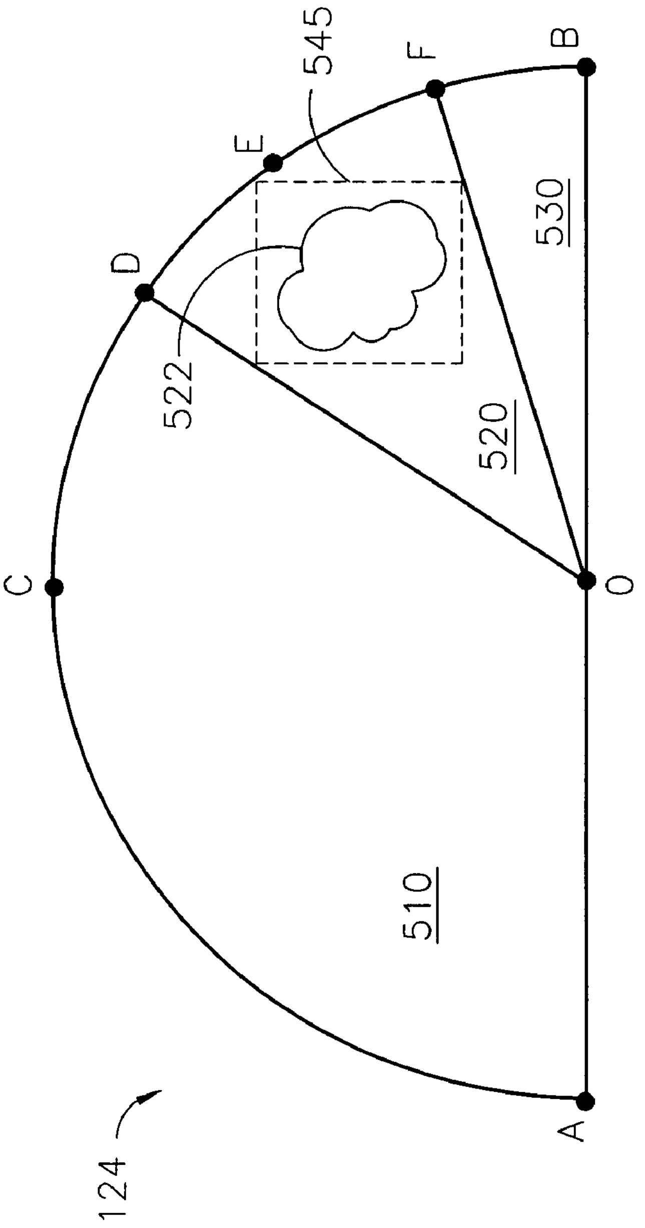
FIG. 5 is a plan view of an image updated and/or presented according to the methods of FIGS. 3 and/or 4.

Systems and methods of the present invention reduce delay in the updating, presenting, and/or refreshing of updated information, especially with respect to information related to hazards for presentation on a hazard display. According to the present invention, updating, presenting, and/or refreshing an image is accomplished in a region having hazard information earlier than other regions of the image and with a scan mode different from the scan mode used when fewer or no hazards exist. Consequently, a region of an image having a hazard may be displayed earlier than other regions of the displayed image. According to various aspects of the present invention, a change from a first scan mode to a new scan mode generally includes a difference in one or more of the start position(s) of the new scan, the direction(s) of the new scan, the extent(s) of the new scan, and/or the resolution of the new scan. Plural start positions, directions, and extents apply, for example, to a fan mode. A change in resolution for a two dimensional image or display may be in either or both dimensions.

A system, according to various aspects of the present invention determines whether a scan mode other than a normal scan mode should be used. For example, system 200 of FIGS. 2-5 performs processes for surveillance, image updating, preparing a presentation that includes an updated image, and displaying the prepared presentation; and employs two scan modes. An alert scan mode may be used for updating, preparing a presentation, and/or displaying (e.g. refreshing) portions of an image having hazard information. A normal scan mode may be used for updating, preparing a presentation, and/or displaying (e.g. refreshing) other portions of the image. In an alternate implementation, preparing a presentation may be omitted as discussed below. In another alternate implementation, updating and refreshing may be combined (e.g., for displaying on a conventional storage display subsystem).

System 200 includes surveillance subsystems 202, processing subsystem 220, display subsystem 240, memory 230, control panel 218, and data bus 205. A surveillance subsystem provides data that may include descriptions of the environment in which system 200 is operating and descriptions of hazards. For example, surveillance subsystems 202 include traffic data acquisition subsystem 210 providing traffic environment and hazard descriptions, terrain data acquisition subsystem 212 providing terrain environment and hazard descriptions, weather data acquisition subsystem 214 providing weather environment and hazard descriptions, and other I/O devices 216 providing other environment and/or hazard descriptions (e.g., GPS position time and position, ADS-B messages from ground vehicles, information from traffic controls, and supervisory systems). Surveillance subsystems 202 may communicate with each other and with processor subsystem 220, memory 230, and control panel 218 via data bus 205. In one implementation, conventional line replaceable units (LRUs) are used (e.g., TCAS, TAWS, GPWS, WXR, and GPS).

Data bus 205 may be any conventional data communication medium.

A control panel permits operator specification and/or selection of values for parameters that govern system operation. For example, a scan mode to be preferred for normal operation may be selected by operation of a multiposition switch. For a rho-theta image, the normal scan mode may be one of clockwise, counterclockwise, wiper, and fan. For a Cartesian image, the normal scan mode may be one of left to right, right to left, alternating left to right and right to left, horizontal fan, top to bottom, bottom to top, alternating top to bottom and bottom to top, and vertical fan. Fan modes may be opening, closing, or alternating. As discussed below, the scan mode specified by the operator for normal scan mode may be overridden by processor subsystem 220. For instance, a lower resolution scan mode may be used for the normal scan mode when an alert scan mode is in use.

System memory may be used for storing instructions for any process performed by system 200 and/or storing data used by any such process. In one implementation, system memory 230 comprises storage for an image to be updated and for data for updating the image. The image and data for updating the image may be stored using any conventional techniques. For example, each representation of a hazard may be indicated in the image and/or in the data for updating the image by use of a distinguishing feature (e.g., a flag, color, texture, or status) associated with the representation to distinguish the representation of the hazard from other non-hazard representations. In other implementations, hazards and hazardous regions are indicated in data structures or signals unique from image data.

A processor subsystem may perform surveillance, image updating, and preparing a presentation that includes an updated image. Any conventional surveillance processing may be included. Any conventional circuitry may be used including general purpose, redundant, fail-over, and special purpose processors. Each processor may include local and/or shared memory and I/O circuits. For example, processor subsystem 220 includes a central processing unit (CPU) 222 having local memory for an operating system, application programs, and data; and includes a display processor 224. CPU 222 and display processor 224 have access to memory 230, providing storage for shared software. CPU 222 and display processor 224 have access via bus 205 to surveillance subsystems 202 for receiving status, data for updating an image, and effecting control of surveillance subsystems 202.

A display processor may perform a process for preparing a presentation that includes an updated image. For example, display processor 224 communicates with display subsystem 240 using hardware (e.g., signaling) and software (e.g., content) interface protocols. For example, when communication between processing subsystem 220 and display subsystem 240 includes a serial interface and data for each radial of a rho-theta image is communicated by a message comprising identification of the radial and data for the radial, display processor 220 determines which radials are to be communicated and the order of communicating radial messages. Responsibility for refreshing pixels at a suitable rate to assure a desired brightness may be assigned to display processor 224, assigned to display subsystem 240, or shared between these entities. In the following discussion, it is assumed that responsibility for refreshing is assigned entirely to display subsystem 240. Consequently, display processor 224 may omit transmission of radial messages for radials having no updated information.

A display subsystem provides a visible presentation of an image with suitable brightness, contrast, color, texture, alphanumeric information, and graphic information. Any number of images may be simultaneously displayed. A display subsystem may cooperate with one or several sources of images. For example, display subsystem 240 includes memory 242, video controller 246, and monitor 250 (e.g., a CRT, LCD, or plasma display). These may be implemented with conventional circuitry and may include processors for refreshing the displayed image (e.g., raster, vector, or random scan techniques). Memory 242 provides storage for the presentations being presented by monitor 250. Generally at least one presentation includes data from an updated image discussed above (e.g., stored in memory 230). In other implementations, system memory 230 includes only the image relating to surveillance; and, other subsystems (not shown) provide images that together comprise a composite presentation stored in display subsystem 240.

In an implementation of system 200 that utilizes a conventional airborne weather radar indicator for display of terrain, CPU 222, memory 230, and terrain data acquisition 212 may be integrated as part of a Terrain Awareness and Warning System (TAWS) unit which provides terrain map display information to the radar display 240. The interface to the weather radar display may conform to the conventional ARINC 708 protocol commonly used between a weather radar and radar display. ARINC 708 uses a 1600-bit data word composed of one 64-bit status word and 512 3-bit data words. An example weather radar display suitable for use with the present invention may display a presentation formatted as a series of 513 radials (also called rays) extending from a center point (also called an origin) to cover a 180° semicircle. Consequently, for this radar display, a resolution of 2.85 radials per degree is available. Additionally with this particular standard, there are up to 512 data points (also known as "range bins") along each radial.

According to various aspects of the present invention, an image and/or a presentation is provided using more than one scan mode. For example, process 300 of FIG. 3, updates an image using two scan modes: a normal scan mode and an alert scan mode. The alert scan mode may be any scan mode discussed above as applied to a the portion of the image comprising a hazardous region. Normal scan mode is used for other portions of the image or presentation not comprising hazardous regions. The image to be updated by process 300 is stored in memory (e.g., memory 230 or memory local to CPU 222 or processor 224). In system 200, process 300 is performed by either CPU 222 or processor 224. Data is obtained (310) for updating the image. Data may be obtained (310) from a conventional surveillance system (202) or process. Such process may include a traffic collision avoidance process, a terrain avoidance process, a ground proximity warning process, a weather warning process, and/or a windshear warning process operating on the same or a different processor (e.g., CPU 222 and/or parts of subsystem 202). Surveillance may be passive (e.g., information is received without inquiry or sensors provide measurement data); or surveillance may be active (e.g., information is obtained by interrogation of other similar systems or on request from a supervisory system). Data for updating the image may be obtained (310) from one or more signals or accessed from memory (e.g., stored there by the surveillance process). If the data obtained for updating indicates a hazard (or a change of status), a suitable portion of the image may be designated as a hazardous region (e.g., a region for improved updating and/or presentation). If the data obtained indicates (320) either a hazard or a hazardous region, that portion of the image that portrays the hazardous region will be processed using the alert scan mode. For (330) each region having hazard indicia, the image is updated (340) using the alert scan mode, until (350) all such regions are updated. For all other portions of the image not comprising hazardous regions, the image is updated (360) using the normal scan mode.

By using the alert scan mode, portions of the image that include descriptions of one or more hazards are generally updated before other portions of the image. The updated image may be continuously available to display subsystem 240 (e.g., an integrated processor and display). The image presented may include updated image information in less time than if the normal scan mode had been used for the image update.

According to various aspects of the present invention, a presentation is prepared and/or refreshed using more than one scan mode. For example, process 400 of FIG. 4, prepares a presentation using two scan modes: a normal scan mode and an alert scan mode. The alert scan mode may be any scan mode discussed above as applied to a the portion of the presentation comprising the hazardous region. Normal scan mode is used for other portions of the presentation not comprising hazardous regions. The presentation prepared by process 400 is communicated to display subsystem 240 and stored in memory 242. In system 200, process 400 is performed by display processor 224. Data is received (410) for preparing a presentation. Data comprising an updated image may be accessed from memory 230, as discussed above. If the received data indicates a hazard (or a change of status), a suitable portion of the presentation may be designated as a hazardous region (e.g., a region for improved presentation or refreshing). If the received data indicates (420) either a hazard or a hazardous region, that portion of the presentation that portrays the hazardous region will be processed using the alert scan mode. For (430) each region having hazard indicia, the presentation is prepared (440) using the alert scan mode, until (450) all such regions are updated. For all other portions of the presentation not comprising hazardous regions, the presentation is prepared (460) using the normal scan mode.

By using the alert scan mode, the presentation that is communicated (e.g., conveyed as messages) to the display subsystem includes descriptions of one or more hazards before other portions of the presentation. Consequently, the displayed image may include descriptions of hazardous regions with less delay than if the normal scan mode had been used for communicating the entire presentation to the display subsystem.

In an alternate implementation, updating and preparing a presentation are integrated so that updated information is communicated to the display subsystem during the process of updating.

The normal scan mode and alert scan mode used by update process 300 may be the same or different from the normal scan mode and/or alert scan mode used by presentation preparation process 400.

The alert scan mode may emphasize tracked hazards by, for example, starting the alert scan at or near the portion of the image or portion of the presentation corresponding to a hazardous region. As a result, an operator viewing monitor 250 (e.g., a pilot or flight crew member) is made aware of the hazard or hazardous region in a more timely manner without delays associated with use of a normal scan mode.

The alert scan mode may increase the resolution of the image or presentation so that portions of the displayed image that include the hazardous region show greater detail than other portions.

Still further, when at least one portion of the image or presentation is processed using the alert scan mode, the resolution of other areas may be reduced to facilitate faster presentation of the displayed image. In one implementation, the resolution of the normal scan mode is decreased.

Use of the alert scan mode for a particular region may persist until after the status of the hazard or hazardous region is downgraded (e.g., no longer includes a highest priority hazard). In other implementations use of the alert scan mode is discontinued after a predetermined time, a predetermined number of presentations are prepared, or a predetermined number of image updates have been made. In other words, the image displayed on monitor 250 may emphasize a first hazardous region (or group of regions) and then revert to normal scan mode to provide contrast for a subsequent second hazardous region (or change in the group of regions).

According to various aspects of the present invention, a hazard display provides a visible image having portions that are more accurate, more timely, and/or emphasized (e.g., color, texture, and/or resolution) in comparison to hazard displays of the prior art. For example, rho-theta image 500 of FIG. 5 may be presented by itself or with other images on monitor 250. Displayed image 500 includes indicia of tracked objects 522. Tracked objects 522 may correspond to weather, terrain, and/or traffic. A hazardous region 545 is distinguished in image 500 from other information by, for example, distinct color (e.g., red or yellow), distinct texture, brightness, or symbology. Displayed image 500 includes regions (e.g., the partial circular 510 area 510 bounded by points A, O, and D; and the partial circular area 530 bounded by points B, O, and F) that have been updated, presented, and/or refreshed using a normal scan mode. In addition, the information in hazardous region 545 has been updated, presented, and/or refreshed in accordance with an alert scan mode (e.g., the partial circular area 520 bounded by points D, O, and F). For a clockwise alert scan mode, update, presentation, and/or refresh may proceed from the radial O-D to the radial O-F. For a random alert scan mode, information and/or pixels within region 545 (or within partial circular area 520) may be updated, presented, and/or refreshed randomly without change to pixels in non-hazardous regions. For an opening fan alert scan mode, update, presentation, and/or refresh may begin with two radials at O-E and proceed simultaneously (e.g., alternating) toward the extremities of the hazardous region (e.g., to radial O-D and to radial O-F). Point E may be determined with reference to: (a) the mathematical center of a representation of the hazard (e.g., terrain); (b) a principal feature of the hazard (e.g., the highest elevation of the terrain or the lead member of closing traffic flying in military formation); and/or (c) a point where the risk due to the hazard may be greatest or soonest encountered (e.g., the most difficult terrain to avoid or the closest member of closing traffic flying in military formation). The hazard avoidance maneuver associated with the greatest aircraft flight path angle (or greatest change) may be used to determine where the risk may be greatest.

Indicia of hazard in data of an image (230) or presentation (242) may be integral or separate. For example, control data or a control signal may accompany or be associated with portions of image or presentation data to identify those portions to be processed with other than a normal scan mode.

A plurality of scan modes may be employed for image update and/or presentation preparation in various implementations of system 200. For example, a different alert scan mode may be used for each of several types of hazards. Hazards are conventionally classified in types as to whether a warning (highest priority) or caution (lower priority) should be issued. Further, traffic hazards may be subject to a set of scan modes (e.g., one normal and one alert) that differ from a set of scan modes for another type of hazard (e.g., weather or terrain).

In rho-theta images, resolution may be increased or decreased in each of two dimensions: rho and theta. In Cartesian images, resolution may be increased or decreased in each of two dimensions: x and y. When an alert mode employs a change of resolution, the quantization along any one or more of these dimensions may be changed for the normal scan mode, the alert scan mode, or both the normal and alert scan modes while the alert scan mode is in effect.

The conventional interface standard defined by ARINC 708 as discussed above defines 512 pixels or range bins along each radial. However, a deviation from that specification of ARINC 708 may be temporarily effected while preparing a presentation (or communicating to display subsystem 240) according to an alert scan mode. For example, 400 range bins per radial may be used for normal scan mode when an alert scan mode is using 512 range bins per radial. The number of radials per degree of image presented on monitor 250 may also be increased in a hazard region per an alert scan mode, or decreased for a normal scan mode while an alert scan mode is in effect.

Figure 6:
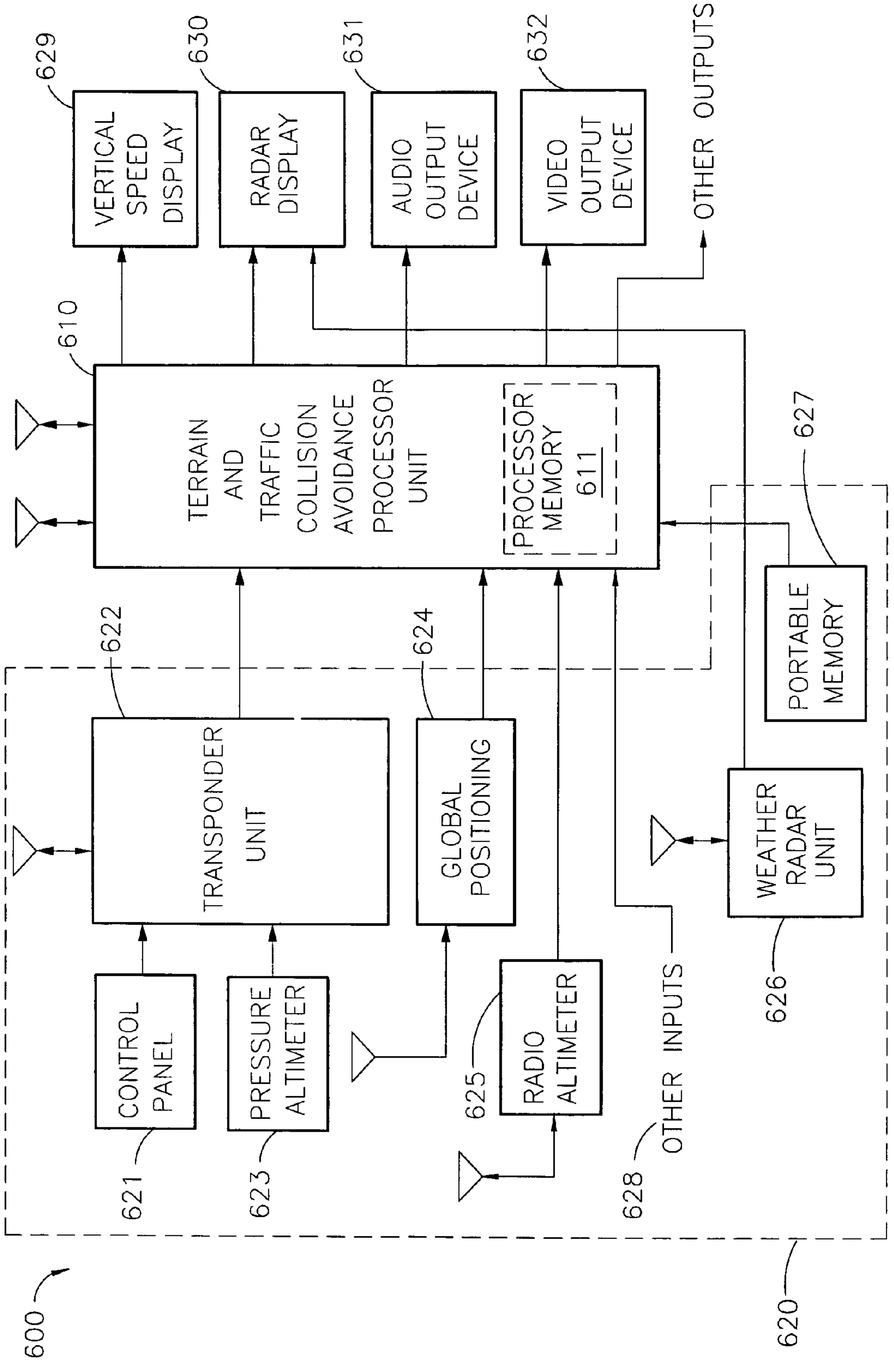
FIG. 6 is a functional block diagram of a terrain and traffic collision avoidance system that performs methods according to the present invention.

An implementation of system 200 comprising line replaceable units may include the line replaceable units of FIG. 6. System 600 includes a conventional transponder 622 cooperating with a transponder control panel 621 and a pressure altimeter 623; a Global Positioning System (GPS) receiver 624; a radio altimeter 625; and a weather radar unit (WXR) 626. These LRUs comprise data acquisition subsystems for cooperation with a terrain and traffic collision avoidance processor unit 610. A portable memory 627 may provide conventional configuration information to unit 610. Unit 610 provides information for vertical speed display 629, radar display 630 (also cooperating with weather radar unit 626), audio output device 631, and video output device 632. Unit 610 may be a conventional $T^2$CAS as marketed by Aviation Communication and Surveillance Systems as modified to perform methods discussed above. Functions performed by system 200 as discussed above may be performed by portions of system 600 as follows: display subsystem 240 corresponds to radar display 630. Memory 230 corresponds to processor memory 611. Processor subsystem 220, traffic data acquisition unit 211, and terrain data acquisition unit 212 correspond to processor unit 610.

In an alternate implementation of system 600, weather radar 626 is coupled to terrain and traffic collision avoidance processor unit 610 for coordinating use of radar display 630 (e.g., use of multiple scan modes and/or resolutions as discussed above).

While the foregoing description of the invention is directed toward a specific application of rho-theta images in aircraft, the systems and methods disclosed herein are not limited to such applications and may also be utilized with Cartesian images and composites of both image technologies. Systems according to the present invention may be used in any vehicular or supervisory application (e.g., automobile displays, watercraft radar displays, or systems for monitoring or controlling vehicular traffic such as stationary air traffic control systems).

Unless contrary to physical possibility, the methods and systems described herein: (a) may be performed in any sequence and/or combination; and (b) the components of respective embodiments may be combined in any manner.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method for the presentation of descriptions of hazards, the method comprising:

employing a first type of scan to process a first portion of the presentation comprising a hazardous region; and employing a second type of scan to process a second portion of the presentation not overlapping the first portion.

2. A system for the presentation of descriptions of hazards, the system comprising:

a memory for storing indicia of a hazardous region and indicia of a nonhazardous region; and a processor for employing a first type of scan to process the indicia of the hazardous region and employing a second type of scan to process the indicia of the nonhazardous region.

3. A method for presenting an image including a hazard, the method comprising:

employing a first type of scan to update a first portion of the image in accordance with data related to the hazard; and employing a second type of scan to update a second portion of the image in accordance with data not related to the hazard;

wherein the first type of scan emphasizes the updating of the first portion of the image, as compared to the updating of the second portion of the image by the second type of scan.

* * * * *